United States Patent [19]

Kimura et al.

[11] Patent Number: 4,512,003
[45] Date of Patent: Apr. 16, 1985

[54] CONTROL CIRCUITRY FOR PRELIMINARY FOCUSING OF LIGHT ON A RECORD MEDIUM SURFACE IN AN OPTICAL REPRODUCING APPARATUS

[75] Inventors: Shuichi Kimura, Shiki; Akira Katsuyama, Yokohama, both of Japan

[73] Assignee: Sony Corporation, Tokyo, Japan

[21] Appl. No.: 454,330

[22] Filed: Dec. 29, 1982

[30] Foreign Application Priority Data

Jan. 9, 1982 [JP] Japan ................... 57-2146

[51] Int. Cl.³ .............................. G11B 7/00
[52] U.S. Cl. ..................... 369/45; 369/46; 250/201
[58] Field of Search .............. 358/335, 342; 250/201–204; 369/44, 45–46

[56] References Cited

U.S. PATENT DOCUMENTS 4,446,546  5/1984  Miller ................... 369/45

Primary Examiner—Robert L. Richardson
Attorney, Agent, or Firm—Lewis H. Eslinger; Alvin Sinderbrand

[57] ABSTRACT

In an optical reproducing apparatus including an optical pickup device directing a light beam at a record medium surface and having at least one photodetector which produces a focus error signal in accordance with the state of focus of the light beam in respect to the record medium surface, and a focus control device responsive to a drive signal for controlling the focus of the light beam in respect to the record medium surface; there are provided a signal generator for producing a preliminary focusing signal which initially varies rapidly toward a first predetermined level of one polarity and then varies relatively slowly toward a second predetermined level of opposite polarity; a detecting device for detecting a zero crossover point of the focus error signal and producing an output signal which varies from a first level to a second level when the zero crossover point is detected; and switching circuitry for supplying the preliminary focusing signal to the focus control device as the drive signal for the latter when the output signal of the detecting device is at its first level and supplying the focus error signal to the focus control device as the drive signal for the latter when the output signal of the detecting device is at its second level.

11 Claims, 12 Drawing Figures

CONTROL CIRCUITRY FOR PRELIMINARY FOCUSING OF LIGHT ON A RECORD MEDIUM SURFACE IN AN OPTICAL REPRODUCING APPARATUS

BACKGROUND OF THE INVENTION

1. Field of the Invention

The present invention relates to controlling the state of focus of a light beam in respect to a record medium surface in an optical reproducing apparatus, and more particularly is directed toward circuitry which controls the preliminary state of focus of a light beam in respect to a disc in an optical reproducing apparatus.

2. Description of the Prior Art

In an optical reproducing apparatus, such as a digital audio disc player, a signal is recorded on a record medium surface, such as a disc, by forming a plurality of pits thereon which are optically readable by an optical pickup device. Typically, the optical pickup device includes an object lens for focusing a light beam on the record medium surface and at least one photodetector which produces a focus error signal indicating the state of focus of the light beam on the record medium surface. Such focus error signal is supplied to a servomechanism which, during reproduction of the optically recorded signal, positionally controls either the entire optical pickup device or the object lens contained therein to properly focus the light beam on the record medium surface.

However, in order for the servomechanism to effectively maintain an acceptable state of focus of the light beam in respect to the record medium surface in response to the focus error signal, the object lens must be within a predetermined range of positions relative to the record medium surface. Thus, a preliminary focusing operation is required to initially position the object lens within that predetermined range. In accordance therewith, an auxiliary focus control circuit generally is provided and supplies a preliminary focus signal to the servomechanism such that following the preliminary focusing operation the beam of light impinging on the record medium surface can be maintained in an acceptable state of focus in response to the focus error signal supplied to the servomechanism.

A typical previously proposed auxiliary focus control circuit is shown in FIG. 1 to include a low frequency oscillator 10 which generates a sine wave or triangular wave voltage having a low frequency and serving as a preliminary focus signal. The preliminary focus signal is supplied, during the preliminary focusing operation to a focus control device, such as an electro-magnetic linear motor 50, through a switch 30 and a focus driving circuit 40. Focus driving circuit 40 typically includes an operational amplifier 41 which receives the preliminary focus signal at its non-inverting input. As is characteristic of circuitry associated with an operational amplifier, resistances $R_{FD1}$, $R_{FD2}$ and $R_{FD3}$ are respectively shown connected between the operational amplifier inverting input and ground, between the operational amplifier inverting input and output, and between the operational amplifier non-inverting input and ground. As is well known in the art, the term "ground" is understood to mean earth potential. An output signal from focus driving circuit 40 is supplied to the coil of linear motor 50. In accordance with the value of the preliminary focus control signal, focus control device or motor 50 varies the position of an optical pickup device 60 or an object lens 61 contained therein. That is, either the entire optical pickup device 60 or object lens 61 is repositioned by focus control device 50 in response to the preliminary focus control signal, supplied by low frequency oscillator 10, such that a beam of light supplied from optical pickup device 60 is properly focused in respect to a surface of a record medium, such as a disc 100.

Variations in the focusing state of the light beam in respect to record medium surface 100 are graphically illustrated in FIG. 2. More specifically, curve C represents variations in the focusing state of the light beam impinging on record medium surface 100 and the distance between the broken lines $L_1$ and $L_2$ represents the normal range of control possible by focus control device 50 in response to a focus error voltage $e_f$ supplied to focus drive circuit 40 from a photodetector 62 contained in optical pickup device 60. Portions of curve C which are above and below a mid-line L respectively correspond to underfocused and overfocused states of the light beam in respect to record medium surface 100. As the focusing condition varies from an underfocused to overfocused state, curve C crosses line L at point A and focus error voltage $e_f$ varies from a negative value to a positive value and passes through a zero crossover point corresponding in time to point A. Additionally, as the focusing condition of the light beam in respect to record medium surface 100 varies from an overfocused state to an underfocused state, curve C crosses point B and focus error voltage $e_f$ varies from a positive value to a negative value passing through a zero crossover point corresponding in time to point B. Both points A and B on curve C represent a substantially focussed state of the light beam on record medium surface 100.

Referring once again to FIG. 1, focus error voltage $e_f$ is shown to be supplied to both a focus discriminating circuit 70 and terminal or fixed contact 32 of switch 30. Additionally, switch 30 is connected to the output of focus discriminator circuit 70. Focus discriminating circuit 70 is designed to detect the zero crossover point of focus error voltage $e_f$ corresponding to point B on curve C. When such a zero crossover point occurs, that is, when focus error voltage $e_f$ changes from a positive value to a negative value, an output signal $S_2$ of focus discriminating circuit 70 varies from a low level to a high level and thereby causes switch 30 to switch its movable contact from engagement with its fixed contact or terminal 31 to engagement with its contact or terminal 32. Thus, in response to a high level of output signal $S_2$, switch 30 terminates the preliminary focusing operation by no longer supplying the output signal of low frequency oscillator 10 to focus driving circuit 40. That is, focus error voltage $e_f$ replaces the preliminary focus signal as the input signal to focus driving circuit 40. The light beam from optical pickup device 60 is now within a controllable range such that focus control device 50 can maintain an acceptable focus state of the light beam on record medium surface 100 by using focus error voltage $e_f$ as the input signal to focus driving circuit 40.

However, as disclosed previously, the auxiliary focus control circuit of FIG. 1 varies the position of optical pickup device 60 or object lens 61 in response to the sine wave voltage or triangular wave voltage of low frequency oscillator 10. Thus, as shown in FIG. 2, in the preliminary focusing operation, the variation in the focusing condition can begin from a just underfocussed state at point D, on curve C, to a very underfocussed state at point E, to a very overfocussed state at point F before reaching point B. Such unnecessary variations in focusing of the light beam are due to the different values of the sine wave or triangular wave voltage which can be assumed at the beginning of the preliminary focusing operation inasmuch as the phase of the sine wave or triangular wave is not fixed at the beginning of a preliminary focusing operation. Therefore, the time interval from the beginning of the preliminary focusing operation to the time when the preliminary focusing operation ends at the point B on curve C can vary undesirably. In particular, the time to complete the preliminary focusing operation can extend up to approximately the period of the sine wave or triangular wave voltage which, for a typically low oscillating frequency of 0.75 hertz (hz), is over one second.

OBJECTS AND SUMMARY OF THE INVENTION

Accordingly, it is an object of the present invention to provide auxiliary focus control circuitry which enables preliminary focusing of a light beam on a record medium surface and which avoids the foregoing disadvantage of the prior art.

More specifically, it is an object of the present invention to provide a new and improved auxiliary focus control circuit which provides a predetermined preliminary focus signal that results in a preliminary focusing operation which is commenced by varying the focus condition of the light beam in a predetermined and constant manner.

It is another object of the present invention to provide an auxilary focus control circuit which effects completion of the preliminary focusing operation within a relatively short period of time as compared with the prior art.

In accordance with an aspect of this invention, an optical reproducing apparatus having an optical pickup device for directing a light beam at a record medium surface and having photodetecting means which produces a focus error signal in accordance with the state of focus of the light beam in respect to the record medium surface and focus control means responsive to a drive signal for controlling the focus of the light beam in respect to the record medium surface; further comprises signal generating means operative for producing a preliminary focusing signal which initially varies rapidly toward a first predetermined level of one polarity with respect to a reference potential and then varies relatively slowly toward a second predetermined level of opposite polarity with respect to the reference potential, detecting means for detecting a zero crossover point of the focus error signal and producing an output signal which varies from a first level to a second level when the zero crossover point is detected, and switching means for supplying the preliminary focusing signal to the focus control means as the drive signal for the latter when the output signal of the detecting means is at its first level and supplying the focus error signal to the focus control means as the drive signal for the latter when the output signal of the detecting means is at its second level.

The above, and other objects, features and advantages of the invention, will be apparent from the following detailed description which is to be read in conjunction with the accompanying drawings.

DETAILED DESCRIPTION OF A PREFERRED EMBODIMENT

Figure 1:
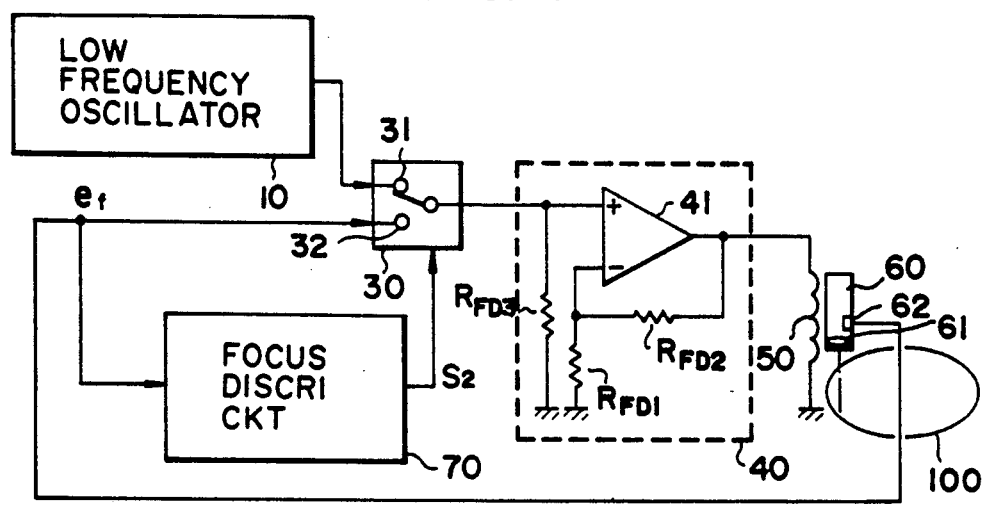
FIG. 1 is a block diagram of an optical reproducing apparatus including a previously proposed auxiliary focus control circuit.
Figure 2:
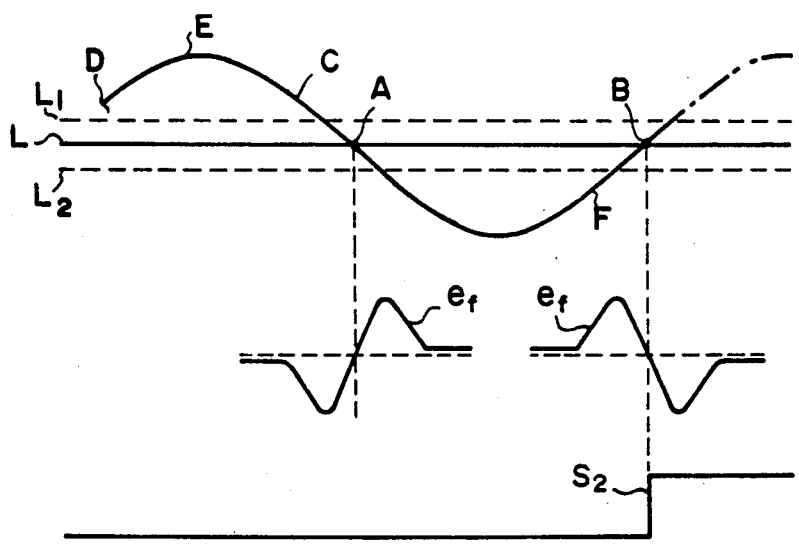
FIG. 2 shows various waveforms illustrating the operation of the optical reproducing apparatus of FIG. 1.
Figure 3:
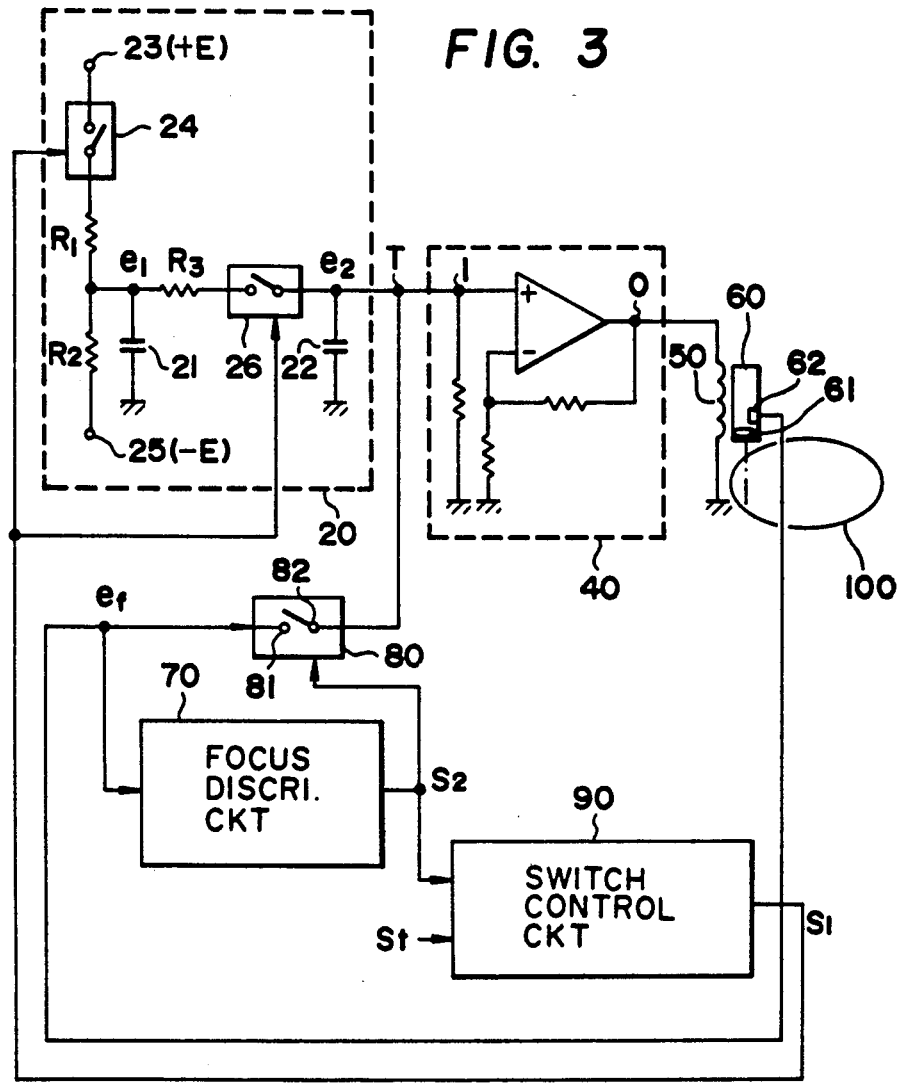
FIG. 3 is a block diagram of an optical reproducing apparatus including an auxiliary focus control circuit in accordance with the present invention.

In FIG. 3, elements and parts corresponding to those of FIG. 1 are marked with the same references and further description thereof will be omitted. In accordance with the present invention, the auxiliary focus control circuit is represented by a voltage generating circuit 20 which produces a preliminary focus voltage $e_2$. Voltage generating circuit 20 comprises terminals 23 and 25 which are respectively connected to a positive voltage source $+E$ and a negative voltage source $-E$ both of which are with respect to ground. Voltage generating circuit 20 also includes capacitors 21 and 22 each of which has one end connected to ground, a switch 24 and a resistor $R_1$ serially connected between terminal 23 and the ungrounded end of capacitor 21, a resistor $R_2$ connected between terminal 25 and the ungrounded end of capacitor 21, a resistor $R_3$ and a switch 26 serially connected between the ungrounded end of capacitor 21 and the ungrounded end of capacitor 22, and an output terminal T connected to the ungrounded end of capacitor 22. Typically, the value of resistor $R_1$ is selected to be less than the value of resistor $R_2$. Connected to output terminal T is an input terminal I of focus driving circuit 40. focus control device 50 is connected to an output terminal 0 of focus driving circuit 40. Photodetector 62 is connected to supply the focus error signal $e_f$ to both focus discriminating circuit 70 and a terminal 81 of a switch 80. From an output of focus discriminator 70 connections are made to both a control terminal of switch 80 and to a switch control circuit 90. A terminal 82 of switch 80 is also connected to input terminal I of focus driving circuit 40. Additionally, an output terminal of switch control circuit 90 is connected to control terminals of both switches 24 and 26 of voltage generating circuit 20.

Figure 4A:
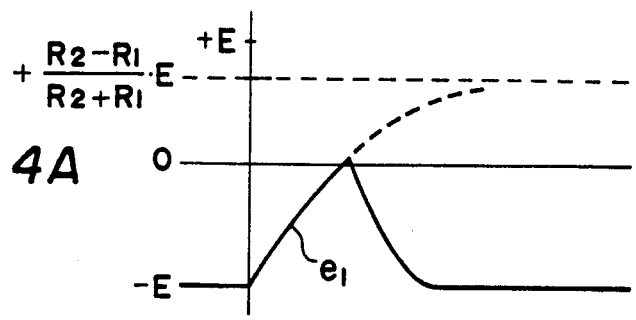
FIGS. 4A-4E and 5A-5D show various voltage waveforms to which reference will be made in explaining the operation of the apparatus of FIG. 3.
Figure 4B:
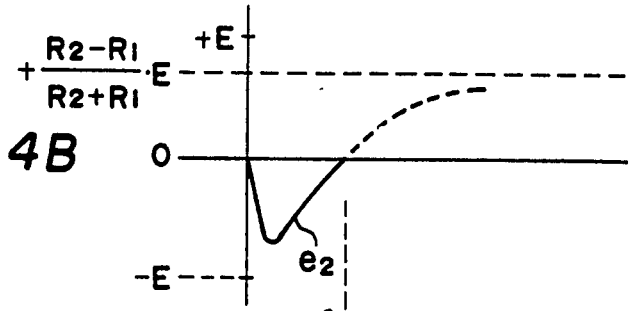

Voltage generating circuit 20 operates as follows: When both switches 24 and 26 are in nonconductive states, the voltage across capacitor 21 represented by voltage $e_1$ is equal to the negative voltage $-E$ and the voltage across capacitor 22 represented by voltage $e_2$ is equal to earth potential. As shown in FIGS. 4A and 4B, when switches 24 and 26 are switched to their respective conductive states at the time $t_0$, capacitor 22 is charged by negative voltage $-E$ which is then across capacitor 21, through resistor $R_3$, whereby voltage $e_2$ initially varies rapidly toward negative voltage $-E$. However, since voltage $e_1$ varies slowly through earth potential toward a positive voltage having the value $$+\frac{R_2-R_1}{R_2+R_1}\times E.$$

voltage $e_2$ does not reach negative voltage $-E$ but instead begins to slowly increase toward the positive voltage $$+\frac{R_2-R_1}{R_2+R_1}\times E.$$

As previously noted, voltage $e_2$ is used as the preliminary focus voltage. Thus, the preliminary focus control voltage initially varies rapidly toward a predetermined negative level of $-E$ and then varies relatively slowly toward a positive value of $$+\frac{R_2-R_1}{R_2+R_1}\times E.$$

Typically, the time lapse between time $t_o$ and the time $t_g$ when voltage $e_2$ is at ground potential, is approximately 0.3 to 0.4 seconds.

Figure 4C:
Figure 4D:
Figure 4E:
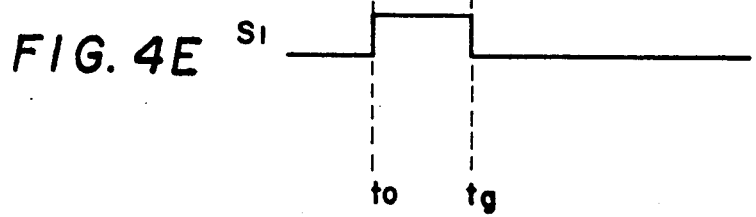

Switches 24 and 26, which normally are electrically ganged together, are switched between their respective conductive and nonconductive states in response to an output signal $S_1$ supplied by switch control circuit 90. At time $t_0$, that is, at the beginning of the preliminary control operation, a signal $S_t$ is suitably applied to an input terminal of switch control circuit 90 and, as a result thereof, an output signal $S_1$ of circuit 90 goes from a low level to high level (FIG. 4E). As output signal $S_1$ changes from a low level to a high level, switches 24 and 26 are switched to their respective conductive states which, in turn, causes preliminary focus voltage represented by voltage $e_2$ to begin its rapid descent toward negative voltage $-E$. Additionally, at time $t_0$, an output signal $S_2$ focus discriminator circuit 70 is at a low level (FIG. 4D). Switch 80, which is responsive to output signal $S_2$, responds to the low level of the latter by assuming its nonconductive state.

As a result of the preliminary focus voltage being supplied to focus control device 50 through focus driving circuit 40, optical pickup device 60, or object lens 61 therein, is positionally adjusted so that the light beam from optical pickup device 60 is properly focused on record medium surface 100. As the focus error voltage $e_f$ photodetector 62, varies from a positive value to a negative value and passes through its zero crossover point, (FIG. 4C), which corresponds to a substantially correct focusing state of the light beam on record medium surface 100, focus discriminating circuit 70 detects this zero crossover point. In other words, focus discriminating circuit 70 detects the transition from an underfocused state to an overfocused state of the light beam on record medium surface 100. Upon detecting this transition, focus discriminating circuit 70 changes output signal $S_2$ from a low level to a high level and, in response to such level variation of output signal $S_2$, switch 80 switches from a nonconductive state to a conductive state enabling focus error voltage $e_f$ to be supplied through switch 80 to input terminal I. Additionally, in response to the variation of output signal $S_2$ from a low level to a high level, output signal $S_1$ of switch control circuit 90 is changed from a high level to a low level, whereby switches 24 and 26 of voltage generating circuit 20 are changed-over to their respective nonconducting states. Accordingly, focus error voltage $e_f$ replaces the preliminary focus voltage as the input signal to focus driving circuit 40.

Figure 5A:
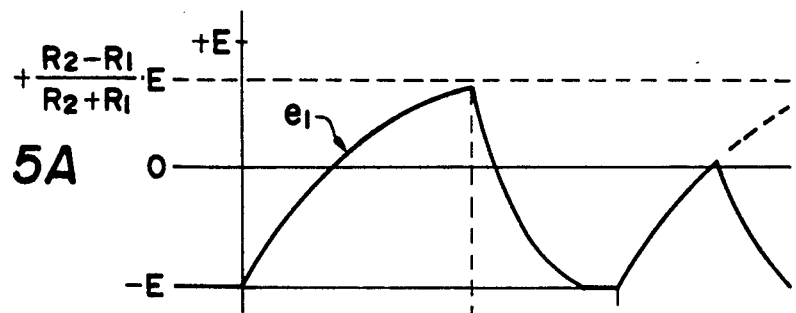
Figure 5B:
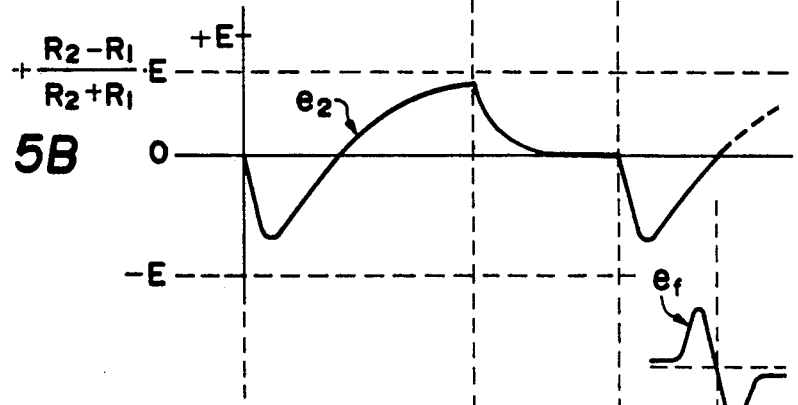
Figure 5C:
Figure 5D:
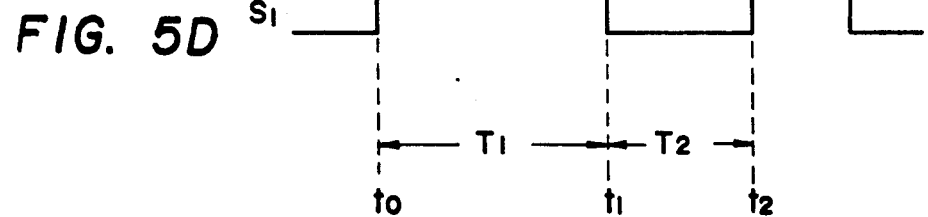

In some instances, focus discriminating circuit 70 may not detect the zero crossover point of focus error voltage $e_f$ as the latter changes from a positive value to a negative value. In such instances, the preliminary focusing operation may be repeated at predetermined time intervals. More specifically, a suitable checking circuit may be provided within switch control circuit 90 for determining whether the level of output signal $S_2$ from focus discriminating circuit 70, has changed from a low level to a high level within a predetermined duration $T_1$ measured from time $t_0$ (FIG. 5C). If output signal $S_2$ has not changed to its high level within such predetermined duration $T_1$, the level of output signal $S_1$ is varied from a high level to a low level, as shown in FIG. 5D. Consequently, switches 24 and 26 are switched to their nonconductive states allowing capacitor 21 to charge to negative voltage $-E$ within a predetermined time duration $T_2$ and allowing voltage $e_2$ to return to ground potential during this same predetermined time duration. At time $t_2$, which corresponds to the sum of predetermined time durations $T_1$ and $T_2$ as measured from $t_0$, output signal $S_1$ is changed from its low level to its high level resulting in switches 24 and 26 once again returning to their respective conductive states. Thus, as shown in FIGS. 5A and 5B, voltages $e_1$ and $e_2$ repeat the waveform patterns shown on FIGS. 4A and 4B, respectively. Accordingly, the previously described preliminary focusing operation is continuously repeated until output signal $S_2$ of focus discriminating circuit 70 assumes its high level.

As disclosed heretofore, switches 24 and 26 of voltage generating circuit 20 are synchronously switched to their respective nonconductive states as switch 80 is switched to its conductive state so that focus error voltage $e_f$ appears across capacitor 22 when switch 80 is turned ON. It is possible, however, to replace switch 80 with a selective switching means, responsive to output signal $S_2$ of focus discriminating circuit 70 for selectively applying focus error voltage $e_f$ and the preliminary focus control voltage to the input of focus driving circuit 40. In such a modified embodiment of the present invention, switches 24 and 26 of voltage generating circuit 20 would be switched periodically between their respective conductive and nonconductive states irregardless of the conductive or nonconductive state of the selective switching means. In this case also, voltages $e_1$ and $e_2$ have periods corresponding to the sum of the predetermined durations $T_1+T_2$.

It will be appreciated from the foregoing, that the present invention provides a preliminary focusing operation, which varies the focus condition of the light beam on a record medium surface in a predetermined and constant manner and which is independent of the phase of a sign wave voltage or triangular voltage of a low frequency oscillator as in the prior art. Advantageously, the preliminary focusing operation can be completed within a relatively short period of time of, for example, 0.3 to 0.4 seconds, as compared to the prior art practice of more than one second.

Additionally, it should be noted that, if the voltage $e_1$ were used as the preliminary focus control voltage focus control device 50 at time $t_0$ would have a large voltage impressed across it resulting in the malfunction thereof or the production of a harsh noise whereas, by using voltage $e_2$ as the preliminary focus control voltage, a much slower increase in the voltage impressed across focus control device 50 is provided and the previously noted problems are avoided.

Having described specific embodiments of the invention with reference to the accompanying drawings, it is to be understood that the invention is not limited to these precise embodiments, and that various changes and modifications may be effected therein by one skilled in the art without departing from the scope or spirit of the invention as defined in the appended claims.

What is claimed is:

1. In an optical reproducing apparatus including an optical pickup device directing a light beam at a record medium surface and having photodetecting means which produces a focus error signal in accordance with the state of focus of said light beam in respect to said record medium surface, and focus control means responsive to a drive signal for controlling the focus of said light beam in respect to said record medium surface: the combination of signal generating means operative for producing a preliminary focusing signal which initially varies rapidly toward a first predetermined level of one polarity with respect to a reference potential and then varies relatively slowly toward a second predetermined level of opposite polarity with respect to said reference potential;

detecting means for detecting a zero crossover point of said focus error signal and producing an output signal which varies from a first level to a second level when said zero crossover point is detected; and switching means operative for supplying said preliminary focusing signal to said focus control means as said drive signal for the latter when said output signal of said detecting means is at said first level and supplying said focus error signal to said focus control means as said drive signal for the latter when said output signal of said detecting means is at said second level.

2. An optical reproducing apparatus as in claim 1; wherein said focus control means has a relatively limited range of focus control when said focus error signal rather than said preliminary focusing signal is supplied as said driving signal thereto.

3. An optical reproducing apparatus as in claim 1; wherein said record medium surface is on a disc.

4. An optical reproducing apparatus as in claim 1; wherein said focus control means includes operational amplifier means for operating on said drive signal supplied by said switching means and a focus actuator responsive to an output of said operational amplifier means.

5. An optical reproducing apparatus as in claim 4; wherein said optical pickup device includes an object lens which is positioned by said focus actuator for focusing said light at said record medium surface.

6. An optical reproducing apparatus as in claim 1; wherein said reference potential is earth potential.

7. An optical reproducing apparatus as in claim 6; wherein said signal generating means comprises first and second terminals respectively connected to predetermined positive and negative voltage levels with respect to earth potential, first and second capacitors each connected at one end to earth potential, a first switch and a first resistor serially connected between said first terminal and the other end of said first capacitor, a second resistor connected between said second terminal and said other end of said first capacitor, a third resistor and a second switch serially connected between said other end of said first capacitor and the other end of said second capacitor and an output terminal connected to said other end of said second capacitor.

8. An optical reproducing apparatus as in claim 7; wherein said first and second switches are ganged for actuation in synchronism with each other.

9. An optical reproducing apparatus as in claim 7; wherein said switching means comprises a third switch actuable by said output signal of said detecting means and having electrically nonconductive and conductive states in response to said first and second levels, respectively, of said output signal of said detecting means, and switch control means operative for producing a switch control signal having first and second values in response to said first and second levels, respectively, of said output signal of said detecting means; and further wherein each of said first and second switches of said signal generating means has an electrically conductive state and a nonconductive state, and each of said first and second switches selectively assumes said conductive and nonconductive states thereof in response to said first and second values, respectively, of said switch control signal.

10. An optical reproducing apparatus as in claim 9; wherein said signal generating means repeatedly produces, at predetermined time intervals, said preliminary focusing signal whenever said first level of said output signal of said detecting means is maintained beyond a first predetermined duration.

11. An optical reproducing apparatus as in claim 10; wherein, at the beginning of each of said predetermined time intervals, each of said first and second switches of said signal generating means is switched to said nonconductive state and is maintained in said nonconductive state for a second predetermined duration and then switched to said conductive state.

* * * * *